United States Patent [19]
Bevilacqua

[11] Patent Number: 4,924,056
[45] Date of Patent: May 8, 1990

[54] DENT PULLER AND METHOD OF USE

[76] Inventor: Richard M. Bevilacqua, 56 Belmont Ave., Ambler, Pa. 19002

[21] Appl. No.: 311,430

[22] Filed: Feb. 14, 1989

Related U.S. Application Data

[63] Continuation of Ser. No. 896,397, Aug. 13, 1986, abandoned.

[51] Int. Cl.⁵ ............................................. B23K 9/00
[52] U.S. Cl. ........................................ 219/98; 219/99; 219/107
[58] Field of Search ............... 219/50, 98, 99, 107, 219/136, 233, 402

[56] References Cited

U.S. PATENT DOCUMENTS

| | | | |
|---|---|---|---|
| Re. 24,367 | 10/1957 | Aversten | 219/98 |
| 2,287,818 | 6/1942 | Nelson | 219/98 |
| 2,342,144 | 2/1944 | Hughes | 219/98 |
| 2,439,830 | 4/1948 | Varela | 219/98 |
| 2,605,658 | 8/1952 | Sanchez . | |
| 2,635,167 | 4/1953 | Nelson | 219/99 |
| 2,676,503 | 4/1954 | Back | 29/402.19 X |
| 2,847,557 | 8/1958 | English . | |
| 2,897,338 | 7/1959 | Haynes | 219/99 X |
| 2,945,118 | 7/1960 | Kelemen et al. . | |
| 2,946,118 | 7/1960 | Steck . | |
| 3,091,983 | 2/1962 | Kliss . | |
| 3,321,607 | 5/1967 | Facone et al. . | |
| 3,801,772 | 4/1974 | Curcio et al. . | |
| 3,881,087 | 4/1975 | Nicosia | 219/233 |
| 3,959,619 | 5/1976 | Schill | 219/50 |
| 4,160,148 | 7/1979 | Jenkins . | |
| 4,562,324 | 12/1985 | Minton . | |
| 4,562,328 | 12/1985 | Shoup . | |

OTHER PUBLICATIONS

Lencospot Mark II Spot Welder Publication.
Toutant's Inc.'s, "Spot-Pull Tool" Operating Manual, No. Grosvenordale Conn., 3/25/76.

Primary Examiner—Leo P. Picard
Assistant Examiner—Lincoln Donovan
Attorney, Agent, or Firm—Caesar, Rivise, Bernstein, Cohen & Pokotilow

[57] ABSTRACT

Apparatus and a method of using it to straighten a dent in a sheet metal workpiece are provided. The apparatus includes a stud welding gun to releasably grip a stud and weld it to the dent, as well as integral hammer means to apply force to the welded stud, straightening the dent. The apparatus and the method of use then provide means for dewelding the stud from the straightened workpiece, thereby avoiding the usual stud cutting and grinding operations. Exchangeable electrodes are provided so that the apparatus can be used for both stud welding and spot welding.

18 Claims, 3 Drawing Sheets

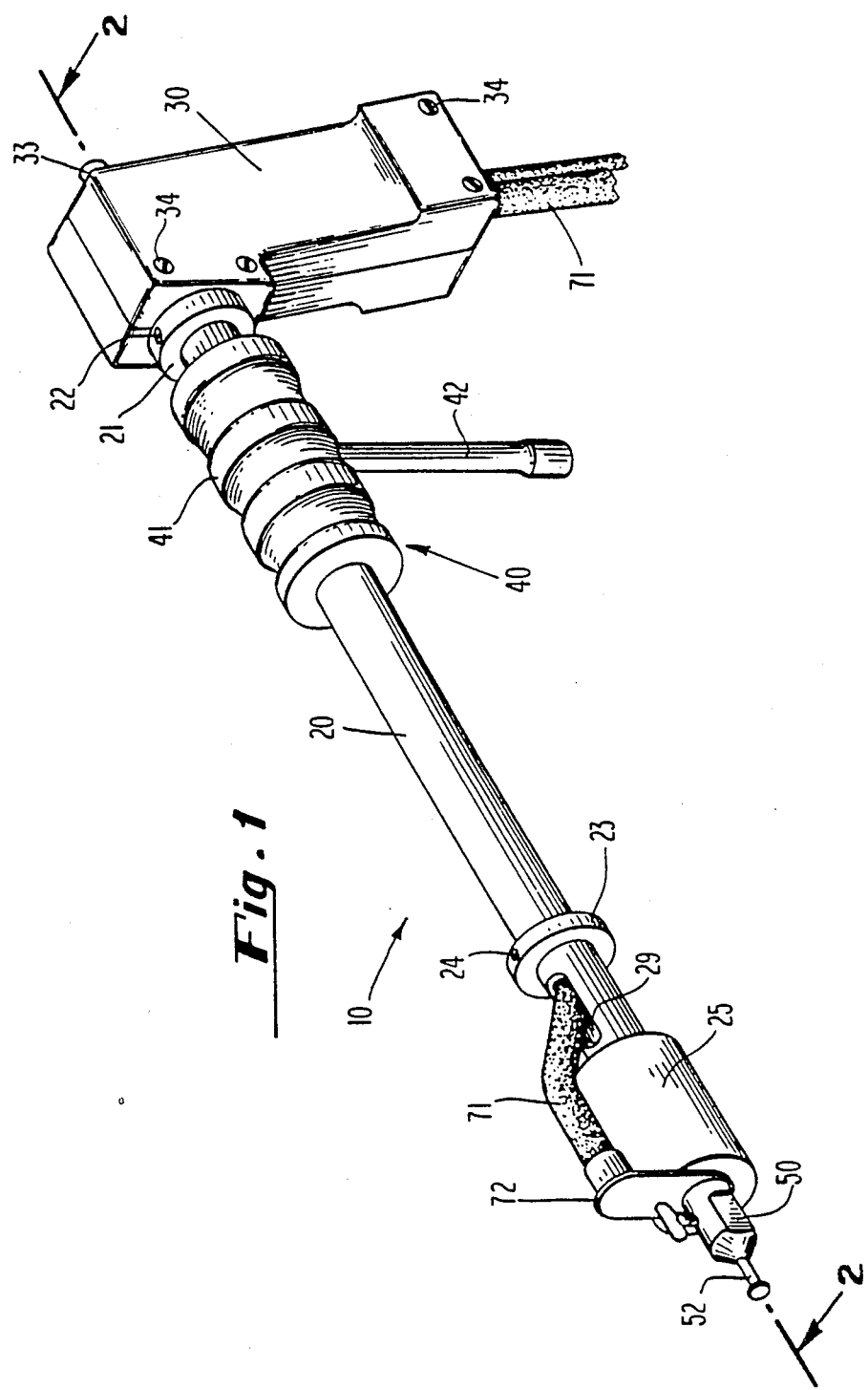

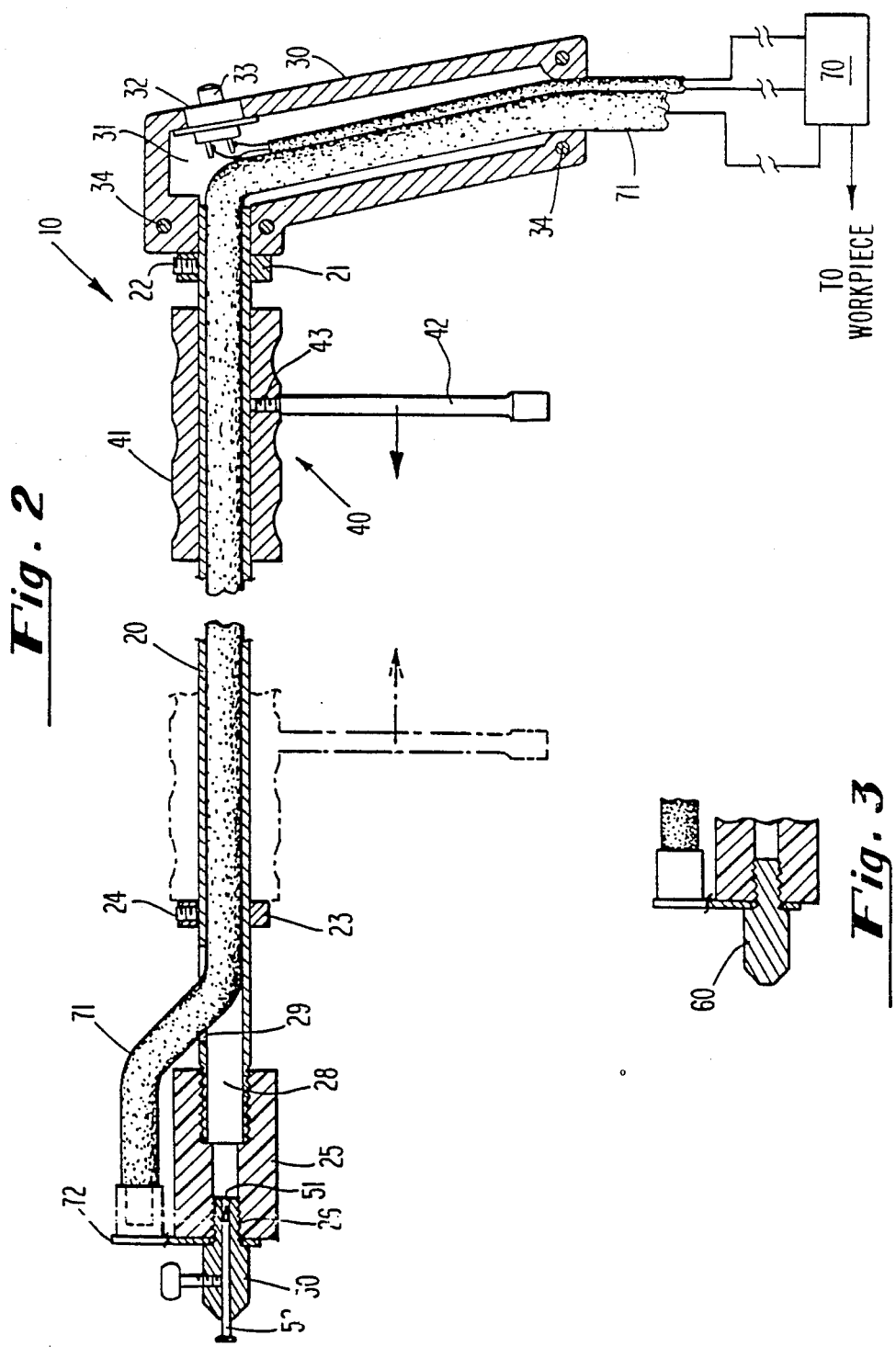

1

DENT PULLER AND METHOD OF USE

This application is a continuation of application Ser. No. 896,397, filed 8/13/86 now abandoned.

BACKGROUND OF THE INVENTION

1. Field of the Invention

This invention is in the field of metal working; more specifically the invention is related to tools employed for straightening dents in sheet metal using a welded stud to pull the dent out.

2. Background Art

Sheet metal panels, such as those found in automobile bodies, are accidentally dented. If the backside of the dent is accessible, as on a fender, the dent can be straightened with a hammer. But if the backside of the dent is concealed, as on a door, more complicated methods are generally used.

For example, it is known in the art to straighten such a dent by attaching an elongated tool to the exposed side of the dent and then "pulling" the dent out by hammering on an anvil member anchored to the tool. The tool may be attached to the dent magnetically, and a slide hammer mounted integrally on the tool shaft as described in U.S. Pat. No. 2,605,658.

Alternatively, a metal stud may be welded to the exposed side of the dent and hammer means then attached to the stud to pull the dent out. The stud is then cut off and ground down before refinishing the panel. U.S. Pat. Nos. 2,847,557; 4,160,148; and U.S. Pat. No. 4,562,328 disclose welding guns especially suited for welding studs. U.S. Pat. No. 3,801,772 discloses a tool for repairing dents which incorporates a stud welding gun and hammer means in the same tool. However, when using any of the tools of the prior art to straighten a dent, it is necessary, after the dent is straightened, to cut the stud off and then grind or file it flush with the panel before refinishing. These operations are time consuming and inefficient.

It is, therefore, one objective of this invention to provide a tool for straightening a dent in a meal workpiece and a method of using it which avoids the cutting and grinding steps associated with the prior art welded stud technique. It is another objective of this invention to provide a welding gun which can be used for either stud welding or spot welding by simply exchanging the electrode. Other objectives will be evident to those skilled in the art of metal working, to whom this application is directed.

The aforesaid objectives are accomplished by providing a tool which includes, not only an elongated welding gun having a welding electrode removably attached thereto for welding a stud to a dented workpiece, but also hammer means as an integral part of the tool, and means for delivering sufficient electric power to remove the stud by dewelding it, thereby avoiding the cited inefficiencies of the prior art.

This invention, the manner of making and using it, will be clarified by reference to the drawings which accompany this specification and to the detailed description which follows.

BRIEF DESCRIPTION OF DRAWINGS

FIG. 1 is a perspective view showing one embodiment of the repair tool of this invention adapted for stud welding.

FIG. 2 is a cross-sectional view taken along line 2—2 of FIG. 1.

FIG. 3 is a partial view, in section like FIG. 2, but showing the tool adapted to spot welding.

DETAILED DESCRIPTION OF THE INVENTION

Figure 4A:
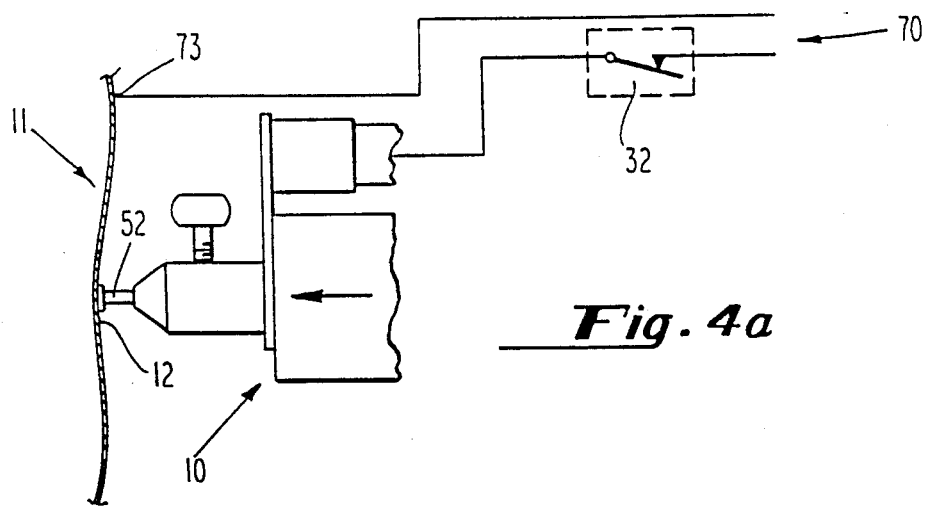
FIG. 4 shows sequentially in a, b, and c, the steps involved in using the tool of this invention to straighten a dent in a piece of sheet metal.

Referring now to the Figures, tool 10 includes housing 20, which has hand grip 30 affixed at the rear end of the housing and electrode 50 affixed at the front end thereof. Housing 20 is an elongated, rigid, preferably cylindrical member with a central linear axis, which may include passage 28, in which case the housing is a straight tube.

Hand grip 30 may be angularly affixed to housing 20, but angularity is not a requirement. The hand grip permits the tool to be positioned easily against the workpiece. It is preferred that the hand grip have a central passage 31, which communicates with passage 28 in the housing. Electric cable 71 and switch 32 with pushbutton 33 are then conveniently placed, the cable being led from the housing through port 29. When constructed in two pieces, as shown in FIG. 1, screws 34 may be employed to hold the two halves of the hand grip together.

As illustrated in FIGS. 1, 2, and 4, tool 10 is adapted for stud welding by causing electrode 50. The electrode is electrically conducting and must be insulated from housing 20. If the housing is constructed of an electrical insulator, electrode 50 may be attached directly to housing 20, but if the housing 20 is made of metal, an electrically insulating electrode holder 25 must be interposed axially between the electrode and the housing. In either case, such an electrically insulating material must be heat resistant and have impact resistance such as that provided by filled resin material preferably thermoset polyimide described in *Modern Plastics Encyclopedia*, 1984–1985, McGraw-Hill, page 76, and preferably SP1 VESPEL made by duPont, or other such materials described therein.

In either case, electrode 50 is mounted to extend axially from the front end of the housing and is removably attached, so as to be exchanged with another electrode if desired. Threaded connections 26 and 27 facilitate such exchange.

Stud welding electrode 50 is adapted to electrically contact and releasably grip stud 52, which projects axially from the electrode. Various means can be employed to accomplish these results; a metallic electrode 50 can be provided with axial channel 51 sized to receive the stud and with threaded screw means 53, directed transverse to the channel, to releasably grip the stud.

Power supply 70, generally a source of AC electric power, is selected to deliver sufficient electric power across stud 52 and workpiece 11 to weld the stud to dent 12, as well as to deweld the stud after the dent is straightened. Suitable power supplies are well known in the stud welding art. The stud can be welded using any of a number of techniques, including resistance and arc welding. Power is supplied to electrode 50 by means of cable 71, switch means 32 including a push button 33 being provided in series to deliver power periodically to first weld the gripped stud to the dent and then deweld the gripped and welded stud from the straightened dent. In conventional manner, when push button 33 is pressed, switch means 32 is actuated to complete an electrical circuit to cable 71 from supply 70. Cable 71 is conveniently terminated by bonding it to contact plate 72, which is held in frictional contact with the electrode.

Hammer means 40, an integral part of the tool, includes manually operated slider 41 and handle 42 threadably connected at 43 to the slider for reciprocating forward and backward axial movement as shown in FIG. 2 a portion of which is in phantom. Slider 41 will strike either rear anvil 21 or front anvil 23, which are rigidly affixed to housing 20, e.g., with threaded screw means 22 and 24, respectively, In the usual case, to pound out a dent, axial force will be delivered to rear anvil 21, and front anvil 23 will function as a stop. It will be evident that many variations in the hammer means are possible.

While the tool of this invention has been described primarily in the context of dent pulling, it can also be used as a welding tool with an exchangeable electrode. The tool can be used for stud welding with electrode 50, but that electrode can be exchanged with other electrodes if desired, e.g., with electrode 60 shown in FIG. 3, providing a spot welder.

With reference now especially to FIG. 4, this invention includes a novel method for straightening a dent 12 in a metal workpiece 11 using tool 10. Tool 10 need only include a welding gun to releasably grip a stud, weld and deweld the stud, and hammer means for delivering force to the gripped stud. The specific details of the welding gun and the hammer means are not critical.

Figure 4B:
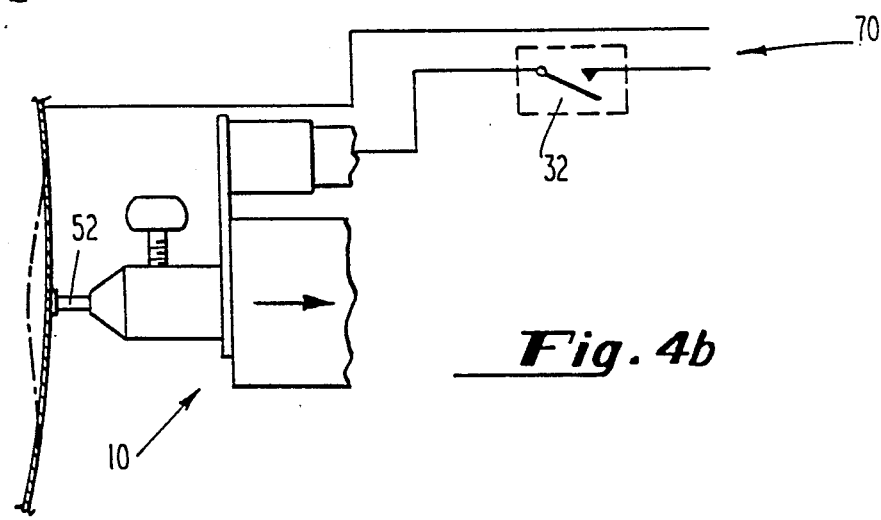
Figure 4C:
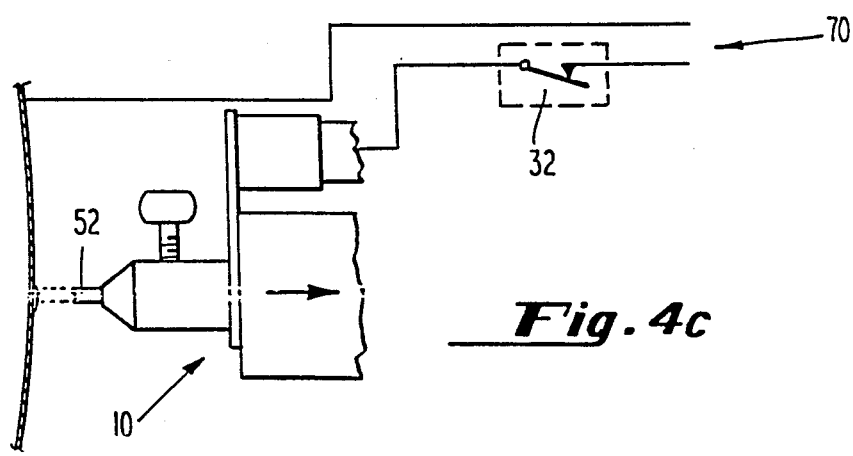

In carrying out the method of this invention, a stud is first welded to the dent with the welding gun as shown in FIG. 4a, switch 32 being closed to deliver sufficient electric power across stud 52 and ground 73. With switch 32 open as in FIG. 4b, the tool hammer means is employed to straighten the dent. Then, as shown is FIG. 4c, switch 32 is again closed, delivering sufficient power to deweld the stud from the workpiece.

It will be evident that numerous variations in both the apparatus and the method of this invention can be made while remaining within the scope of the following claims.

What is claimed is:

1. A method for straightening a dent in a metal workpiece comprising the consecutive steps of:
    (a) applying a fusible stud to said workpiece at the location of said dent;
    (b) applying electrical energy to said stud to cause said stud to fuse to said workpiece and terminating the application of said energy to said stud when the stud is welded to said workpiece sufficiently securely to withstand the application of a pulling force thereon to pull said dent out of said workpiece;
    (c) pulling on said stud in a direction away from said workpiece to thereby straighten said dent; and
    (d) applying electrical energy to said stud to cause said stud to melt at its junction with said workpiece while pulling on said stud in a direction away from said workpiece to cause said stud to separate from said workpiece, leaving said workpiece without the stud attached thereto.

2. The method of claim 1 wherein said steps are accomplished through the use of a single tool.

3. The method of claim 2 wherein said tool comprising releasable stud holding means, electrical energy providing means, and stud pulling means.

4. The method of claim 3 wherein said stud pulling means comprises a slidable hammer means and associated anvil means, and wherein the step of pulling on said stud is effected by sliding said hammer means in a direction away from said dent into contact with said anvil means.

5. Apparatus for straightening a dent in a metal workpiece comprising releasable stud holding means, energy providing means, and stud pulling means, said stud holding means being arranged to releasably hold a fusible stud to apply it to the workpiece at the location of said dent, actuating means for causing said energy providing means to supply electrical current through the junction of said stud and said workpiece, whereupon the resistance of said junction causes said stud to fuse to said workpiece, the energy provided by said energy providing means being terminated when the stud is welded to said workpiece sufficiently securely to withstand the application of a pulling force thereon to pull said dent out of said workpiece, said stud pulling means being arranged for pulling on said stud in a direction away from said workpiece after it has been welded to said workpiece to thereby straighten said dent, said energy applying means supplying electrical current to the now welded stud workpiece junction to cause said stud to melt at said junction, said pulling means being actuatable at that time to pull on said stud in a direction away from said workpiece to cause said stud to deweld and separate from said workpiece, leaving said workpiece without the stud attached thereto.

6. The apparatus of claim 5 wherein said stud pulling means comprises a slidable hammer means and associated anvil means, said hammer means being arranged to be slid in a direction away from said dent into contact with said anvil means to effect the pulling of said stud to straighten said dent.

7. The apparatus of claim 5 wherein said stud holding means comprises an electrode, said electrode conveying electrical current to said stud during said welding and dewelding steps.

8. The apparatus of claim 7 wherein said apparatus comprises a housing and an insulator, said being insulator secured to said electrode and located between said electrode and said housing for electrically isolating said electrode from said housing.

9. The apparatus of claim 8 wherein said stud pulling means is mounted on said housing and comprises slidable hammer means and associated anvil means, said anvil means being connected to said insulator, said hammer means being arranged to be slid in a direction away from said dent into contact with said anvil means to effect the pulling of said stud, with said insulator serving as a means for conveying the dent pulling force to said stud from said anvil means.

10. The apparatus of claim 9 wherein said stud is releasably gripped by said electrode.

11. The apparatus of claim 10 wherein said electrode includes a passage into which a portion of said stud extends and threaded screw means for releasably gripping said stud in said passage.

12. The apparatus of claim 5 additionally comprising a housing having an elongated member, said stud pulling means comprising slidable hammer means and associated anvil means, said anvil means being connected to said elongatd member, said hammer means being slideably mounted on said elongated member to enable it to be slid in a direction away from said dent into contact with said anvil means to effect the pulling of said stud to straighten said dent.

13. The apparatus of claim 12 wherein said hammer means is manually slidable.

14. The apparatus of claim 13 additionally comprising handle means projecting out from said hammer means to enable said hammer means to be gripped manually to effect its sliding along said elognated member.

15. The apparatus of claim 7 wherein said electode includes a passage into which a portion of said stud extends and threaded screw means for releasably gripping said stud in said passage.

16. The apparatus of claim 12 wherein said housing additionally comprises a handgrip portion connected to said elongated member.

17. The apparatus of claim 7 additionally comprising a housing having an elongated member, said stud pulling means comprising slidable hammer means and associated anvil means, said anvil means being connected to said elongated member, said hammer means being slideably mounted on said elongated member to enable it to be slid in a direction away from said dent into contact with said anvil means to effect the pulling of said stud to straighten said dent.

18. The apparatus of claim 17 wherein said elongated member is hollow and includes an electrical conductor passing therethrough, said electrical conductor being connected to said electrode.

* * * * *